(12) United States Patent
Fujii

(10) Patent No.: US 8,750,004 B2
(45) Date of Patent: Jun. 10, 2014

(54) THREE LEVEL INVERTER DEVICE

(75) Inventor: Kansuke Fujii, Machida (JP)

(73) Assignee: Fuji Electric Co., Ltd. (JP)

( * ) Notice: Subject to any disclaimer, the term of this patent is extended or adjusted under 35 U.S.C. 154(b) by 162 days.

(21) Appl. No.: 13/313,253

(22) Filed: Dec. 7, 2011

(65) Prior Publication Data
US 2012/0155135 A1  Jun. 21, 2012

(30) Foreign Application Priority Data

Dec. 17, 2010  (JP) ................................. 2010-281950

(51) Int. Cl.
*H02M 7/48*  (2006.01)

(52) U.S. Cl.
USPC .......................................................... 363/98

(58) Field of Classification Search
USPC ........... 363/130, 98, 56.01–56.05, 37, 40, 55, 363/71, 131; 307/38; 318/400.22
See application file for complete search history.

(56) References Cited

U.S. PATENT DOCUMENTS 7,031,172 B2 *  4/2006  Tanaka et al. ............... 363/56.03
7,088,073 B2 *  8/2006  Morishita ..................... 318/801

FOREIGN PATENT DOCUMENTS

JP  2004120883 A  *  4/2004
JP  3759334 B2     1/2006

* cited by examiner

*Primary Examiner* — Adolf Berhane
*Assistant Examiner* — Jye-June Lee
(74) *Attorney, Agent, or Firm* — Rossi, Kimms & McDowell, LLP

(57) ABSTRACT

Aspects of the invention can include capacitors which series-divide the voltage of a DC power source, an inverter circuit formed by bridge-connecting semiconductor switching elements to which diodes are antiparallel-connected, and bidirectional switches connected between a connection point of the capacitors and the AC output terminals of the inverter circuit. When the voltage of the DC power source is lower than a prescribed value, the inverter circuit can be caused to operate as an ordinary three-phase inverter, and when the voltage of the DC power source is higher than a prescribed value the inverter circuit can be caused to operate as a V-connected inverter, and when caused to operate as a V-connected inverter, a halted phase can be switched in sequence according to line voltages or output currents.

2 Claims, 8 Drawing Sheets

FIG.5A LINE VOLTAGE INSTRUCTION ABSOLUTE VALUE SIGNALS

FIG.5B MODULATION SIGNALS

FIG.7A OUTPUT CURRENT ABSOLUTE VALUE SIGNALS

FIG.7B MODULATION SIGNALS

US 8,750,004 B2

THREE LEVEL INVERTER DEVICE

BACKGROUND OF THE INVENTION

1. Field of the Invention

Embodiments of the invention relate to three-phase inverter devices that convert a DC voltage into a three-phase AC voltage.

2. Description of the Related Art

DC electric power generated by solar cells, fuel cells and similar devices is typically converted into AC power by an inverter device and can either supplied directly to a load, or the converted AC power is interconnected with a system and supplied to a load. However, solar cells, fuel cells, and other power sources have characteristics such that the greater the increase in output current, the more the output voltage falls. Further, solar cells and similar have characteristics such that a decline in ambient temperature is accompanied by a rise in output voltage.

When the output voltage of a DC power source having such characteristics is converted to an AC voltage by an inverter device, in general a chopper circuit is provided between the DC power source and the inverter device. Through the action of the chopper circuit, the inverter device input voltage is held at a prescribed value, and the voltage utilization factor of the inverter device can be improved.

However, provision of a chopper circuit can be a factor impeding cost reduction of a power conversion device. Hence a method is adopted in which a chopper circuit is not provided, and the voltage of the DC power source is directly converted into an AC voltage. However, there is the problem with this method that, when the output voltage of the DC power source is high, switching losses of the inverter device increase, and the device efficiency declines.

Hence in Japanese Patent Publication No. 3759334, relating to methods of driving a three-phase electric motor, a method is proposed in which a three-phase inverter device is operated as a so-called V-connected inverter. See FIG. 8.

In FIG. 8, item 1 is a DC power source and item 2 is a capacitor series circuit, formed by connecting a capacitor 21 and a capacitor 22 in series, and is connected to both ends of the DC power source 1. The point of connection of the capacitor 21 and the DC power source 1 is a first terminal P, the point of connection of the capacitor 22 and the DC power source 1 is a second terminal N, and the point of connection of the capacitors 21 and 22 is a third terminal C. The capacitors 21 and 22 are first and second DC voltage sources which halves the voltage of the DC power source 1.

Three-phase inverter circuit 3, the input terminals on the positive side and the negative side are connected to the first terminal P and second terminal N of the capacitor series circuit. The inverter circuit 3 comprises a circuit in which positive-side semiconductor switching elements Qu to Qw connected to the first terminal P and negative-side semiconductor switching elements Qx to Qz connected to the second terminal N are connected in a three-phase bridge conFIGuration. Further, the semiconductor switching elements Qu to Qw and Qx to Qz are antiparallel-connected to the diodes Du to Dw and Dx to Dz. The connection point of semiconductor switching elements Qu and Qx, the connection point of Qv and Qy, and the connection point of Qw and Qz are respectively the AC output terminals U, V, W of the inverter circuit 3.

Switch circuit 4a is formed by connecting in parallel a mechanical switch 41 and a bidirectional switch 42. One end of the switch circuit 4a is connected to the third terminal C, and the other end is connected to the AC output terminal V. An electric motor 5a is the load of the inverter circuit 3. Control circuit 6a generates control signals for the inverter circuit 3 and switch circuit 4a.

In the above-described three-phase inverter device, when a revolution rate instruction of the electric motor 5a is higher than a prescribed value, the inverter circuit 3 operates as an ordinary three-phase inverter. At this time, the mechanical switch 41 and bidirectional switch 42 of the switch circuit 4a are both off, and all of the three-phase semiconductor switching elements perform switching operation. As a result, most of the losses occurring in the three-phase inverter device occur in the semiconductor switching elements of the inverter circuit 3.

On the other hand, when a revolution rate instruction of the electric motor 5a is lower than a prescribed value, the inverter circuit 3 operates as a so-called V-connected inverter. At this time, the mechanical switch 41 and bidirectional switch 42 of the switch circuit 4a are on, and only the semiconductor switching elements of U phase and W phase perform switching operation.

As a result, most of the losses occurring in the three-phase inverter device occur in the semiconductor switching elements of the U phase and W phase. Hence losses of the three-phase inverter device are reduced by approximately ⅔ compared with a case in which the inverter circuit 3 is caused to perform three-phase inverter operation.

However, when a three-phase inverter device is caused to operate as a three-phase inverter, losses occur uniformly in the semiconductor switching elements of all phases. On the other hand, when the three-phase inverter device shown in FIG. 8 is caused to operate as a V-connected inverter, losses occur only in the semiconductor switching elements of the U phase and W phase. Further, losses occurring in one semiconductor switching element are greater when the device is caused to operate as a V-connected inverter than when operated as a three-phase inverter.

As a result, under the same cooling conditions, there is a problem that the output capacity is reduced for V-connected inverter operation compared with three-phase inverter operation.

SUMMARY OF THE INVENTION

Embodiments of the invention address these and other needs. Embodiments of the invention provide a three-phase inverter device which renders uniform the losses of semiconductor switching elements when operated as a V-connected inverter, and which enables improvement of the device output capacity.

To do so, a three-phase inverter device of embodiments of the invention comprises a DC voltage source series circuit, formed by series connection of a first DC voltage source and a second DC voltage source; a first terminal connected to a positive-side terminal of the DC voltage source series circuit, a second terminal connected to a negative-side terminal of the DC voltage source series circuit, and a third terminal connected to a connection point of the first DC voltage source and the second DC voltage source; and three switching element series circuit groups, each formed by series connection of positive-side and negative-side semiconductor switching element, to each of which a diode is antiparallel-connected; one end of each of the switching element series circuits being connected to the first terminal and the other end being connected to the second terminal; and each of the connection points of the positive-side semiconductor switching element and the negative-side semiconductor switching element being a three-phase AC output terminal, wherein the AC output terminal for each phase of the three-phase inverter device is connected via a bidirectional switch to the third terminal; and that, when the voltage across both terminals of the DC voltage source series circuit is higher than a prescribed value, the positive-side and negative-side semiconductor switching elements of one of the phases are made non-conducting, and the bidirectional switch connecting the AC output terminal for the phase and the third terminal is made conducting, and in addition the positive-side and negative-side semiconductor switching elements of the other two phases and the bidirectional switches connected to these phases are caused to perform switching operation, but when the voltage across both terminals of the DC voltage source series circuit is lower than a prescribed value, the positive-side and negative-side semiconductor switching elements and bidirectional switches of all phases of the three-phase inverter device are caused to perform switching operation.

Further, in embodiments of the invention, when in the above-described three-phase inverter device the voltage across both terminals of the DC voltage source series circuit is higher than a prescribed value, the positive-side and negative-side semiconductor switching elements of the two phases for which an absolute value of the voltage across the AC output terminals is highest and the bidirectional switch connecting these phases are caused to perform switching operation, and the positive-side and negative-side semiconductor switching elements of the remaining one phase are made non-conducting, and moreover the bidirectional switches connected to this phase are made conducting.

Further, in embodiments of the invention, when in the above-described three-phase inverter device the voltage across both terminals of the DC voltage source series circuit is higher than a prescribed value, the positive-side and negative-side semiconductor switching elements of the phase, for which an absolute value of the current output from the AC output terminals is largest, are made non-conducting, and moreover the bidirectional switch connected to this phase is made conducting, and in addition the positive-side and negative-side semiconductor switching elements and the bidirectional switches connected to the other two phases are caused to perform switching operation.

By way of embodiments of the invention, depending on the state of the voltages between the three phase lines or the output current state, while sequentially switching phases performing switching operation as a V-connected inverter, a desired three-phase AC voltage can be output. Consequently, losses of the semiconductor switching elements can be rendered uniform.

Further, losses of the semiconductor switching elements can be rendered uniform, so that compared with a case in which phases are fixed and V-connected inverter operation is performed, a three-phase inverter device with higher output capacity can be provided.

DETAILED DESCRIPTION

Figure 1:
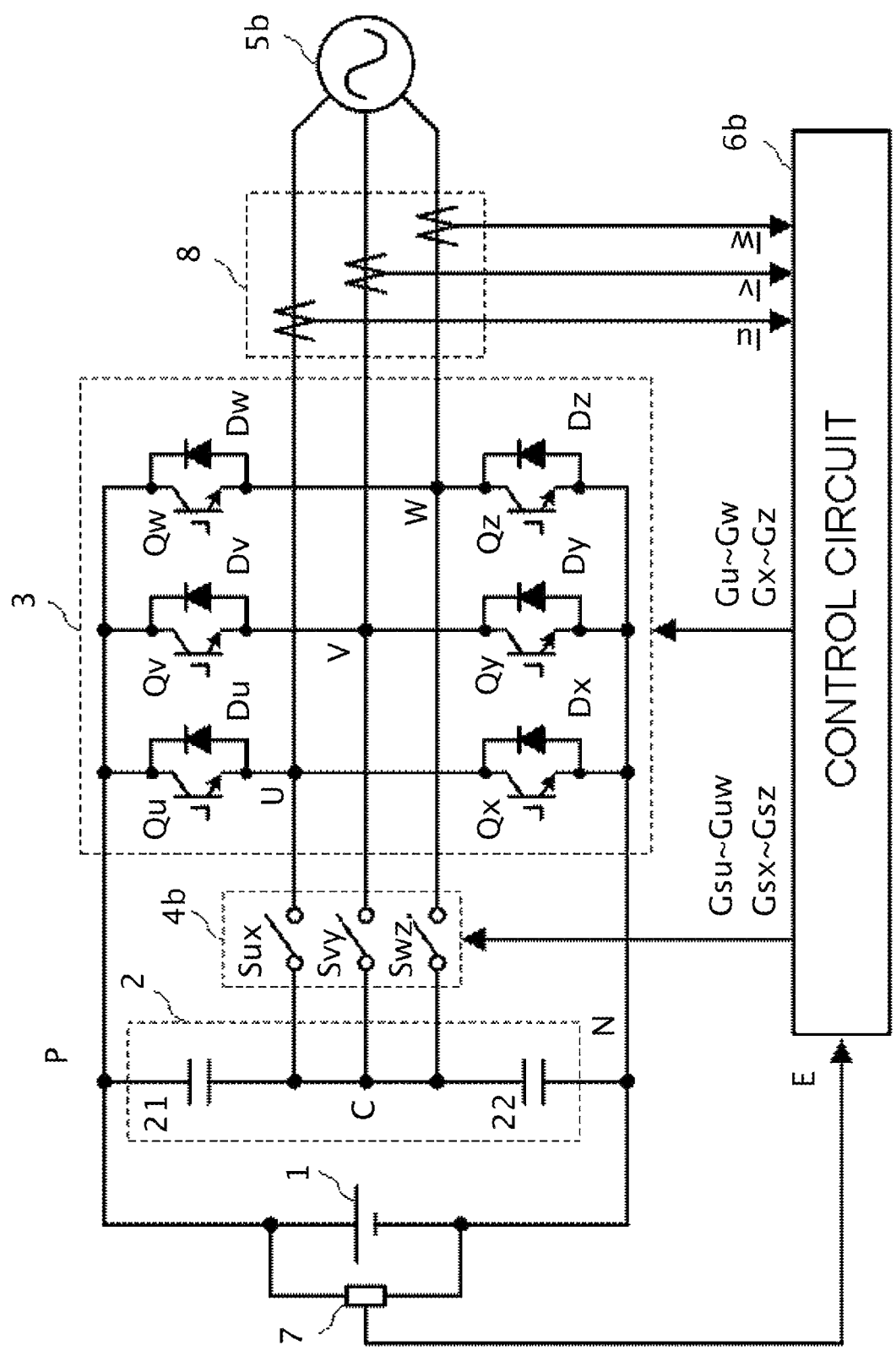
FIG. 1 is a circuit diagram used to explain a three-phase inverter device in accordance with embodiments of the invention.
Figure 8:
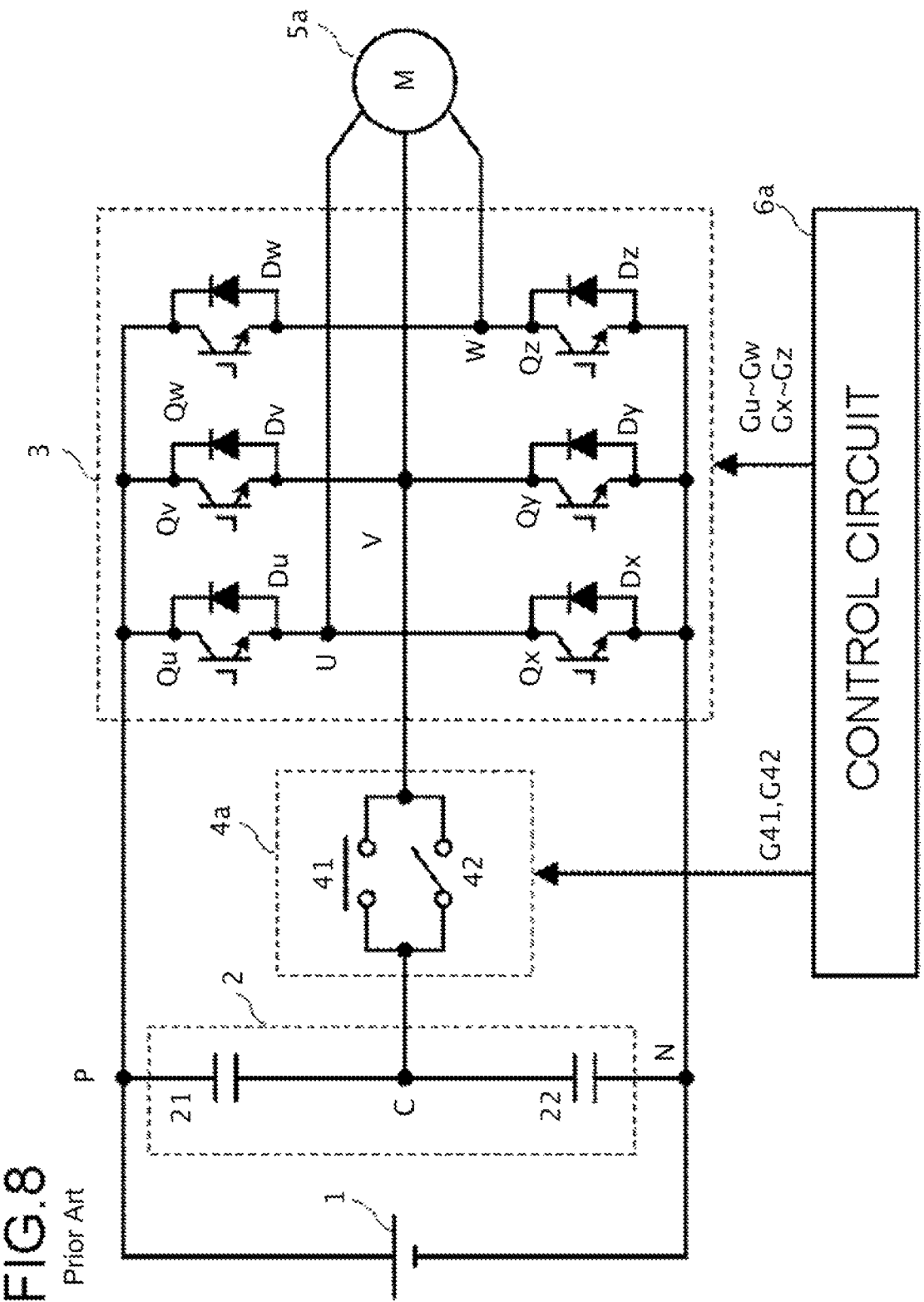
FIG. 8 is a schematic circuit diagram used to explain a three-phase inverter device of the related art.

FIG. 1 illustrates a first embodiment of a three-phase inverter device of embodiments of the invention. The constituent elements assigned the symbols 1 to 3 are the same as the constituent elements of the three-phase inverter device of FIG. 8.

Figure 2A:
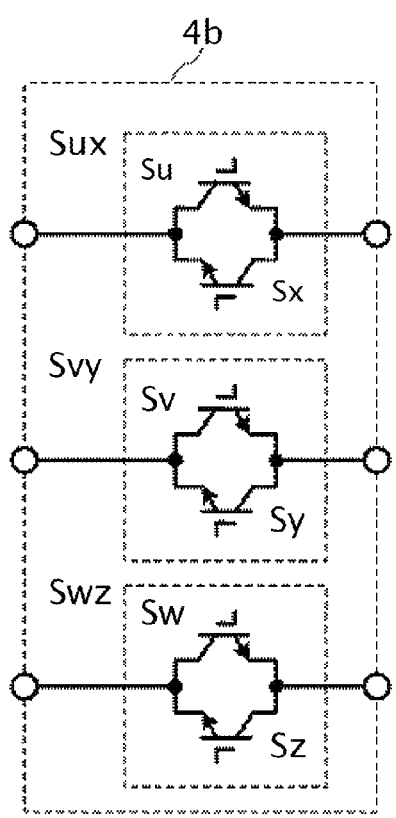
FIG. 2A is a schematic circuit diagram of a switching circuit using an RB-IGBT.
Figure 2B:
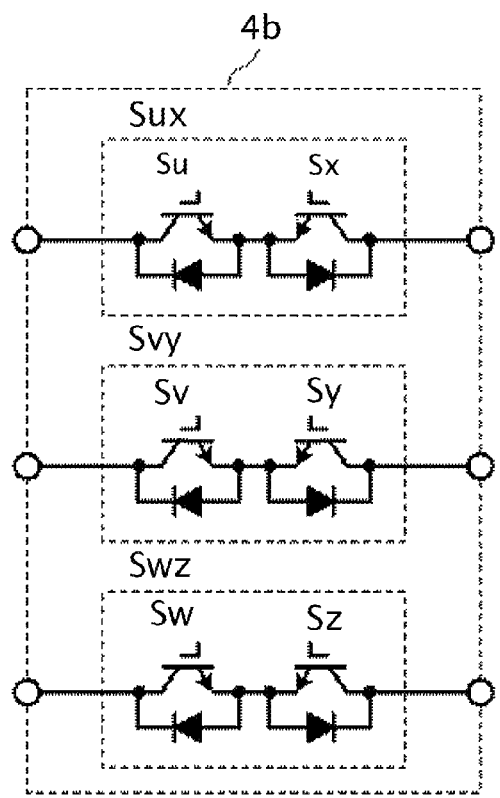
FIG. 2B is a schematic circuit diagram of a switching circuit using an ordinary IGBT.

Switch circuit 4b comprises bidirectional switches Sux, Svy, Swz. The bidirectional switch Sux is connected between the third terminal C of the capacitor series circuit 2 and the AC output terminal U of the inverter circuit 3. Similarly, the bidirectional switch Svy is connected between the third terminal C and the AC output terminal V, and the bidirectional switch Swz is connected between the third terminal C and the AC output terminal W. The bidirectional switches Sux, Svy, Swz are circuits in which RB (Reverse-Blocked)-IGBTs (switch elements Su to Sw and Sx to Sz) are antiparallel-connected, as shown in FIG. 2A, or are circuits in which ordinary IGBTs (switch elements Su to Sw and Sx to Sz) are antiparallel-connected, as shown in FIG. 2B.

Three-phase AC power source 5b is connected to the AC output terminals U to W of the inverter circuit 3. 7 is a DC voltage detector to detect the voltage across the terminals of the DC power source 1. 8 is a current detector to detect the currents Iu, Iv, Iw output from the inverter circuit 3. A load, not shown, is connected between the current detector 8 and the three-phase current source 5b, and power is supplied from the three-phase current source 5b or the inverter circuit 3.

Figure 3:
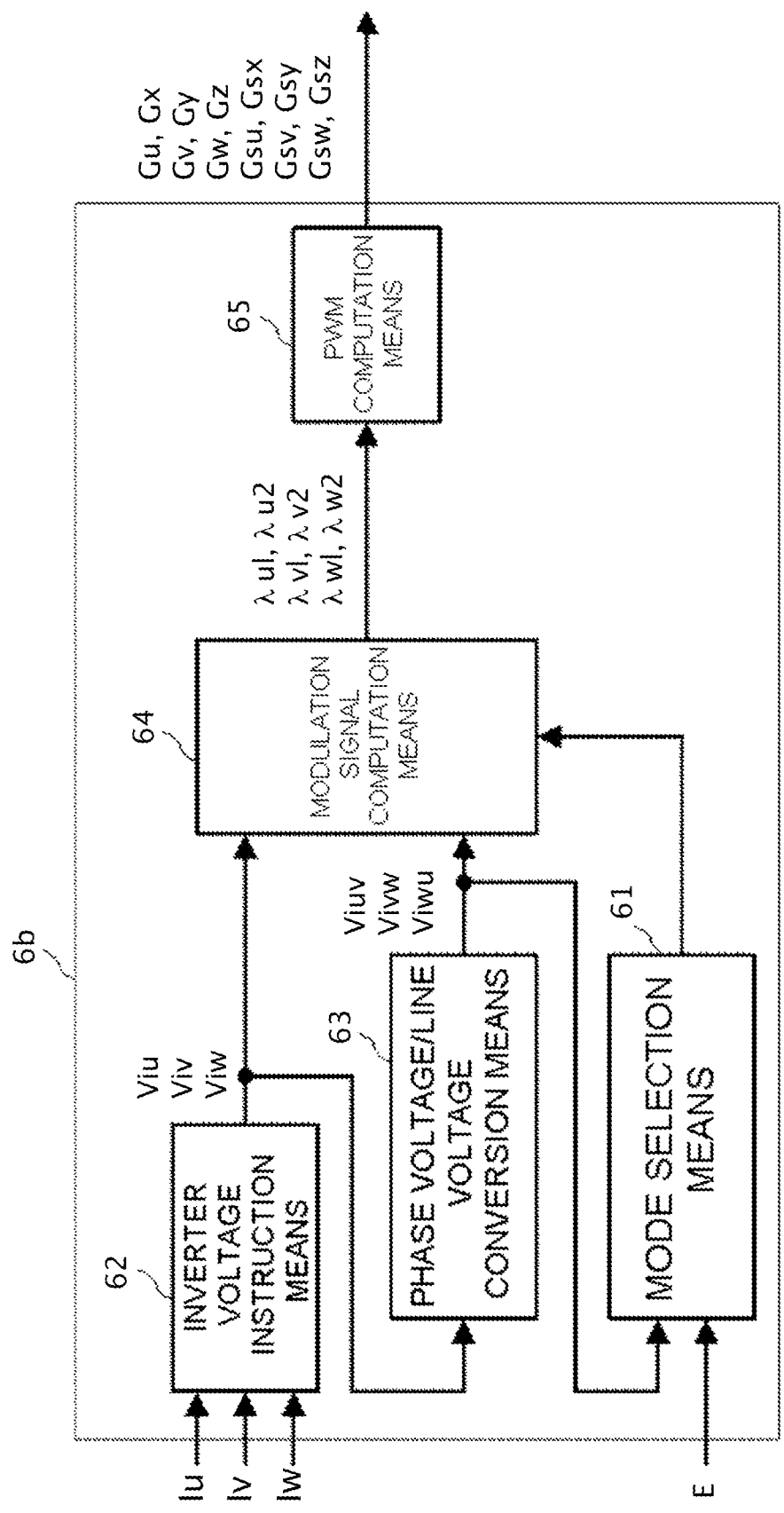
FIG. 3 is a block diagram of a control circuit of a three-phase inverter device, in accordance with embodiments of the invention.

Control circuit 6b to generate control signals Gu to Gw and Gx to Gz for the semiconductor switching elements Qu to Qw and Qx to Qz of the inverter circuit 3 and control signals GSu to GSw and Gsx to Gsz for the switch elements Su to Sw and Sx to Sz of the switch circuit 4b, based on signals detected by the above detectors. In detail, the control circuit 6b is configured as in the block diagram shown in FIG. 3. In FIG. 3, 61 is mode selection means, 62 is inverter voltage instruction means, 63 is phase voltage/line voltage conversion means, 64 is modulation signal computation means, and 65 is PWM computation means.

The mode selection means 61 takes as inputs the voltage E of the DC power source 1 detected by the DC voltage detector 7, and line voltage instruction signals Viuv, Vivw, Viwu output from the phase voltage/line voltage conversion means 63. When the voltage E of the DC power source 1 is adequate to output the maximum values of the absolute values of the line voltage instructions Viuv, Vivw, Viwu, the mode selection means 61 outputs an instruction (hereafter called a V-connected inverter instruction) to cause the inverter circuit 3 to operate as a V-connected inverter. On the other hand, when the voltage E of the DC power source 1 is insufficient to output the maximum values of the absolute values of the line voltage instructions Viuv, Vivw, Viwu, the mode selection means 61 outputs an instruction (hereafter called a three-phase inverter instruction) to cause the inverter circuit 3 to operate as an ordinary three-phase inverter.

The output currents Iu, Iv, Iw of the inverter circuit 3 detected by the current detector 8 are input to the inverter voltage instruction means 62. When the inverter circuit 3 performs interconnected operation with the three-phase AC power source 5b, the inverter voltage instruction means 62 computes voltage instruction values to cause the output currents Iu to Iw to coincide with instruction values. Computation results are output as the phase voltage instructions Viu, Viv, Viw. On the other hand, when the inverter circuit 3 does not perform interconnected operation with the three-phase AC power source 5b, but instead operates as a voltage source, the inverter voltage instruction means 62 outputs desired voltage instruction values as the phase voltage instructions Viu, Viv, Viw.

The phase voltage/line voltage conversion means 63 converts the phase voltage instructions Viu, Viv, Viw output from the inverter voltage instruction means 62 into line voltage instructions Viuv, Vivw, Viwu, which are output.

When the output from the mode selection means 61 is a three-phase inverter instruction, the modulation signal computation means 64 converts the phase voltage instructions Viu, Viv, Viw output by the inverter voltage instruction means 62 into first and second modulation signals $\lambda u1$, $\lambda u2$, $\lambda v1$, $\lambda v2$, $\lambda w1$, $\lambda w2$ for each phase, which are output. On the other hand, when the output from the mode selection means 61 is a V-connected inverter instruction, the line voltage instructions Viuv, Vivw, Viwu output by the phase voltage/line voltage conversion means 63 are converted into first and second modulation signals $\lambda u1$, $\lambda u2$, $\lambda v1$, $\lambda v2$, $\lambda w1$, $\lambda w2$ for each phase, which are output.

The PWM computation means 65 performs comparison of the first and second modulation signals $\lambda u1$, $\lambda u2$, $\lambda v1$, $\lambda v2$, $\lambda w1$, $\lambda w2$ for each phase output from the modulation signal computation means 64 and the carrier signal C. The PWM computation means 65 outputs signals obtained by comparison as control signals Gu to Gw and Gx to Gz of the semiconductor switching elements Qu to Qw and Qx to Qz and control signals Gsu to Gsw and Gsx to Gsz of the switch elements Su to Sw and Sx to Sz.

Next, operation of the control circuit 6b is explained separate for operation of the inverter circuit 3 as an ordinary three-phase inverter and for operation as a V-connected inverter, referring to FIGS. 4A to 4D and FIG. 5.

First, operation of the control circuit 6b when the inverter circuit 3 is operated as an ordinary three-phase inverter is explained. At this time, the output of the mode selection means 61 is a three-phase inverter instruction. Further, operation of the inverter voltage instruction means 62 and phase voltage/line voltage conversion means 63 is as described above.

The modulation signal computation means 64 computes modulation signals $\lambda u$, $\lambda v$, $\lambda w$ for each phase based on the phase voltage instructions Viu, Viv, Viw output from the inverter voltage instruction means 62. Based on the modulation signals $\lambda u$, $\lambda v$, $\lambda w$ for each phase, the first and second modulation signals $\lambda u1$, $\lambda u2$, $\lambda v1$, $\lambda v2$, $\lambda w1$, $\lambda w2$ for each phase are calculated.

Figure 4:
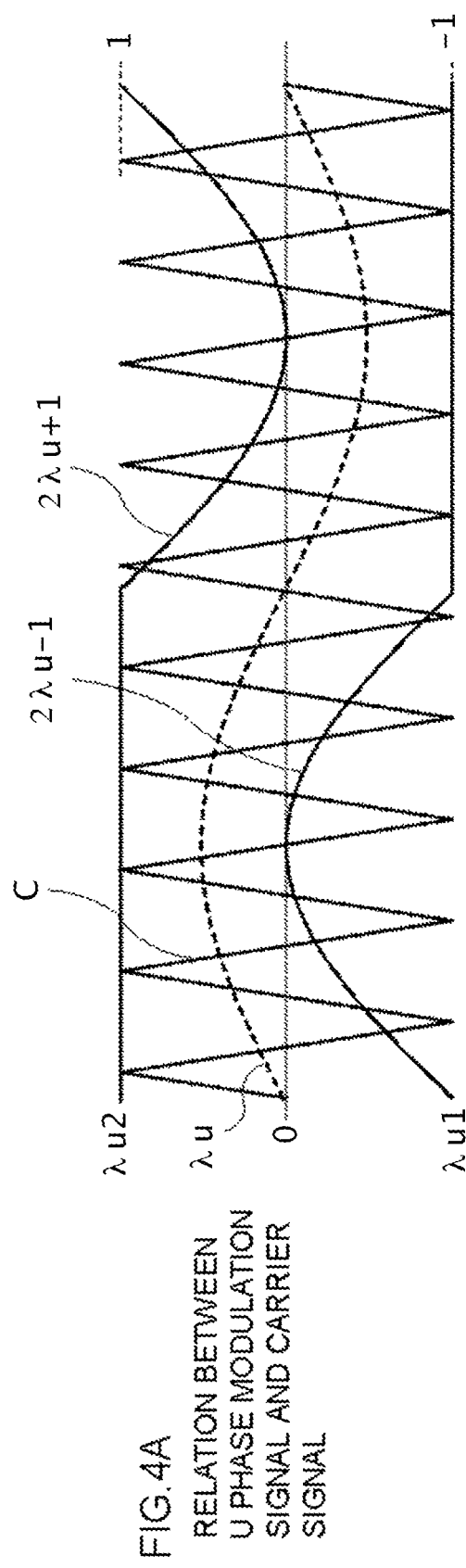
FIG. 4A is a timing diagram showing the relation between U phase modulation signals and carrier signals in embodiments of the invention.
FIG. 4B is a timing diagram showing Qu control signals.
FIG. 4C is a timing diagram showing Su control signals.
FIG. 4D is a timing diagram showing the phase voltage of the U phase.
Figure 5:
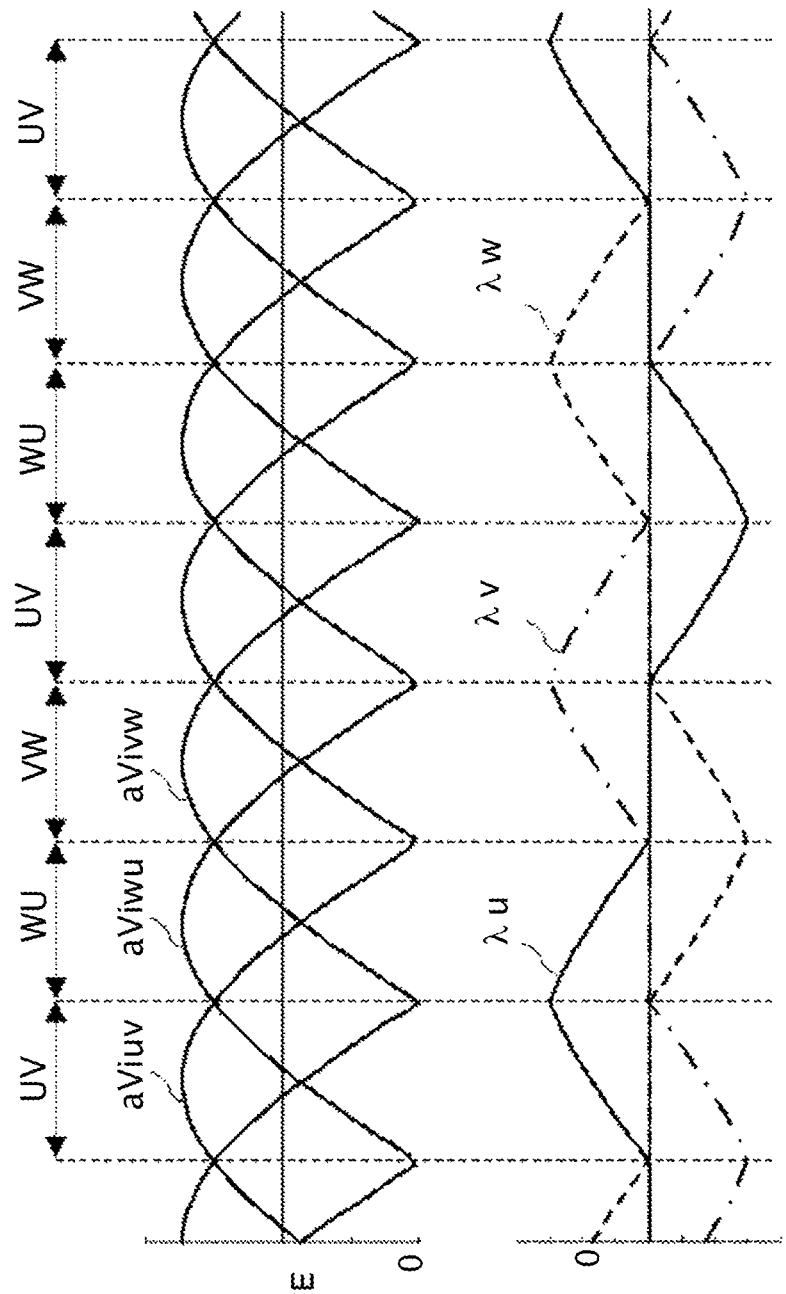
FIG. 5A is a timing diagram showing absolute value signals of line voltage instructions.
FIG. 5B is a timing diagram showing modulation signals.

FIG. 4A shows the relation between the modulation signal $\lambda u$ for the U phase and the first and second modulation signals $\lambda u1$ and $\lambda u2$ for the U phase, as representative of the modulation signals for each phase and the first and second modulation signals for each phase. The modulation signal Xu for the U phase and the first and second modulation signals $\lambda u1$ and $\lambda u2$ for the U phase are related by $\lambda u1=2\times\lambda u-1$ and $\lambda u2=2\times\lambda u+1$. However, when as a result of the above relations the first and second modulation signals $\lambda u1$ and $\lambda u2$ take on values of 1 or higher or −1 or lower, the first and second modulation signals $\lambda u1$ and $\lambda u2$ are limited to 1 or to −1.

The PWM computation means 65 compares the magnitudes of the first and second modulation signals $\lambda u1$ and $\lambda u2$ for the U phase and the carrier signal C. As a result of comparisons, the PWM computation means 65 generates a high control signal when the modulation signals $\lambda u1$ and $\lambda u2$ are higher than the carrier signal C, and generates a low control signal when the signals are lower. The generated control signals are shown in FIG. 4B and FIG. 4C. FIG. 4B shows the control signal Gu for the semiconductor switching element Qu, obtained as the result of comparison of the first modulation signal $\lambda u1$ for the U phase and the carrier signal C. FIG. 4C shows the control signal Gsu of the switch element Su, obtained as the result of comparison of the second modulation signal $\lambda u2$ for the U phase and the carrier signal C.

When the control signal Gu is high, the semiconductor switching element Qu is turned on, and when the control signal Gu is low the semiconductor switching element Qu is turned off. And when the control signal Gsu is high the switch element Su is turned on, and when the control signal Gsu is low the switching element Su is turned off.

The control signal Gx of the U phase semiconductor switching element Qx is the signal obtained by inverting the control signal Gsu of the switch element Su. And, the control signal Gsx of the switch element Sx is the signal obtained by inverting the control signal Gu of the semiconductor switching element Qu.

The semiconductor switching elements Qu and Qx of the inverter circuit 3 and the switch elements Su and Sx of the bidirectional switch Sux perform on/off operation according to the above control signals generated by the control circuit 6b. As a result, the phase voltage of the U phase shown in FIG. 4D is output to the AC output terminal U of the inverter circuit 3.

By a similar procedure the control signals for the V phase and W phase are generated, and the phase voltage for the V phase and W phase are output to the AC output terminals V and W of the inverter circuit 3. As a result, the inverter circuit 3 operates as an ordinary three-phase inverter, and the desired three-phase AC voltages are output to the AC output terminals U to W.

At this time, the semiconductor switching elements Qu to Qw and Qx to Qz and the switch elements Su to Sw and Sx to Sz perform uniform switching operation, so that the losses in all elements are uniform.

Next, a case is explained in which switching operation is performed for the two phases with the highest line voltages, and the AC output terminal of the remaining one phase is connected to the third terminal C of the capacitor series circuit 2, to cause the inverter circuit 3 to operate as a V-connected inverter.

In this case, the modulation signal computation means 64 calculates the modulation signals $\lambda u$, $\lambda v$, $\lambda w$ for each phase based on the line voltage instructions Viuv, Vivw, Viwu output from the inverter voltage instruction means 62. Further, based on the modulation signals $\lambda u$, $\lambda v$, $\lambda w$ for each phase, the first and second modulation signals $\lambda u1$, $\lambda u2$, $\lambda v1$, $\lambda v2$, $\lambda w1$, $\lambda w2$ for each phase are calculated.

An example of a method of calculation of the modulation signals $\lambda u$, $\lambda v$, $\lambda w$ for each phase is explained below. First, the absolute values of each of the line voltage instructions Viuv, Vivw, Viwu output from the inverter voltage instruction means 62 are calculated. Next, the phase voltage instruction of the phase not involved in the line voltage which is highest among the absolute values of the line voltage instructions Viuv, Vivw, Viwu is taken to be 0 V. Under this condition, the phase voltage instructions for the other two phases are calculated.

For example, in the interval indicated by interval UV in FIG. 5A, the absolute value aViuv of the line voltage Viuv is highest. Hence the phase voltage instruction Viw for the W phase which is not involved in the line voltage instruction Viuv is taken to be 0 V. As a result, the phase voltage instruction Viu for the U phase is Viu=−Viwu, and the phase voltage instruction Viv for the V phase is Viv=Viuv. Next, by performing similar computations for the intervals WU, VW, . . . , the phase voltage instructions Viu, Viv, Viw for each phase shown in FIG. 5B can be obtained. From the phase voltage instructions Viu, Viv, Viw for each phase, the modulation signals λu, λv, λw for each phase can be obtained.

Thereafter, operation of the control circuit $6b$ is the same as when operating the above-described inverter circuit 3 as an ordinary three-phase inverter.

As a result, control signals for the semiconductor switching elements Qu to Qw and Qx to Qz and the switch elements Su to Sw and Sx to Sz can be obtained.

The semiconductor switching elements Qu to Qw and Qx to Qz and the switch elements Su to Sw and Sx to Sz of the inverter circuit 3 perform on/off operation according to the above-described control signals generated by the control circuit $6b$. At this time, the semiconductor switching elements of the two phases for which the absolute values of the line voltage instructions are highest perform switching operation. The semiconductor switching elements of the remaining one phase are in the off state, and the bidirectional switch connected to this phase is in the on state. As a result, the inverter circuit 3 operates as a V-connected inverter.

Further, when the inverter circuit 3 operates as a V-connected inverter, phases for which switching operation are performed are switched in sequence according to the magnitude relation between the absolute values of the line voltage instructions. As a result, losses of the semiconductor switching elements are rendered uniform.

Next, a case is explained in which the AC output terminal of the phase for which the output current is largest is connected to the third terminal C of the capacitor series circuit 2, and switching operation is performed for the remaining two phases, to cause the inverter circuit 3 to operate as a V-connected inverter.

Figure 6:
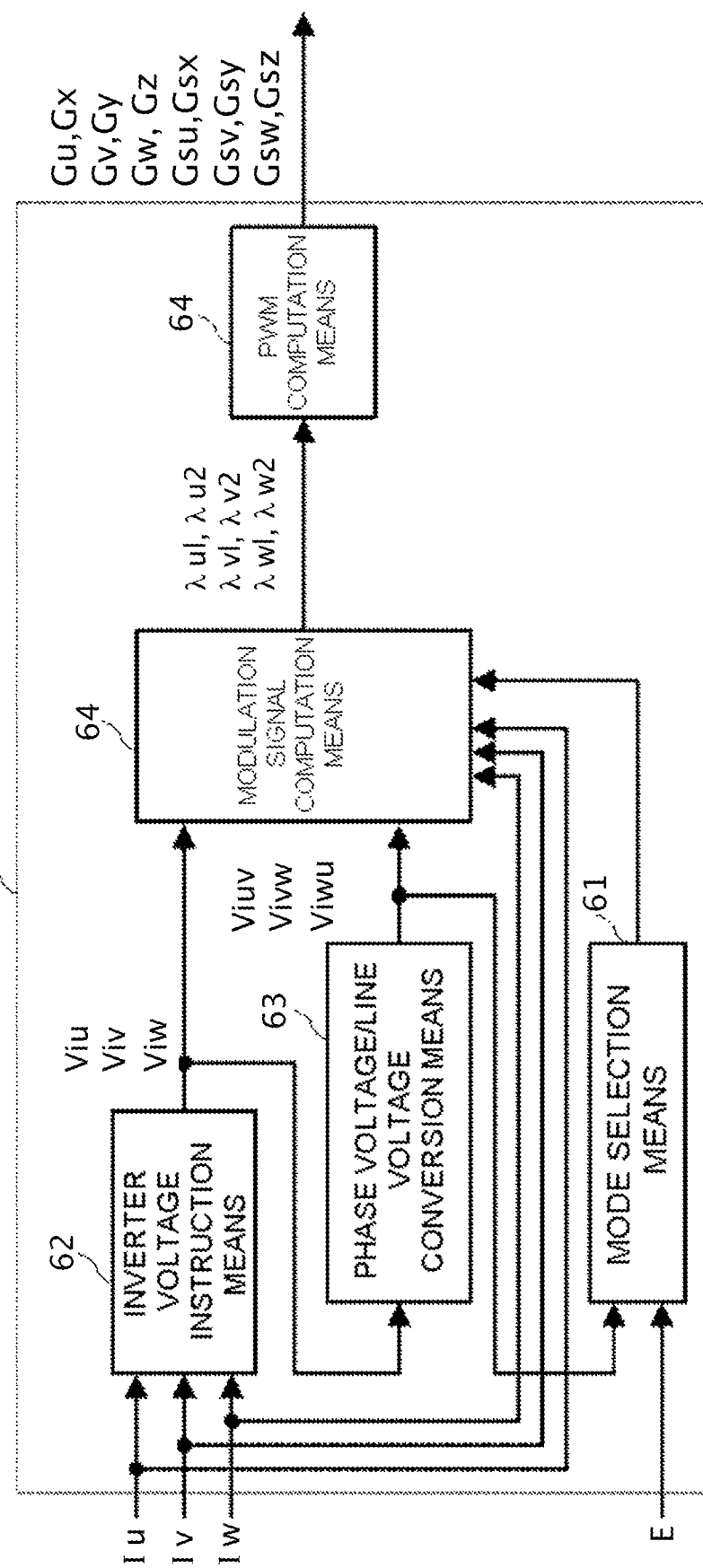
FIG. 6 is a block diagram showing the control circuit of a three-phase inverter device of this invention.

FIG. 6 is a block diagram used to explain the control circuit in this case. The constituent elements of the control circuit $6c$ are the same as the constituent elements of the control circuit $6b$ shown in FIG. 3. However, there is a difference in that the output currents Iu, Iv, Iw detected by the current detector 8 are input to the modulation signal computation means 64. Further, operation of the modulation signal computation means 64 when the inverter circuit 3 is operated as a V-connected inverter is different.

Specifically, when a V-connected inverter instruction is output from the mode selection means 61, the modulation signal computation means 64 takes the voltage instruction for the phase with the largest output current to be 0 V, and calculates the phase voltage instructions for the other two phases.

Figure 7:
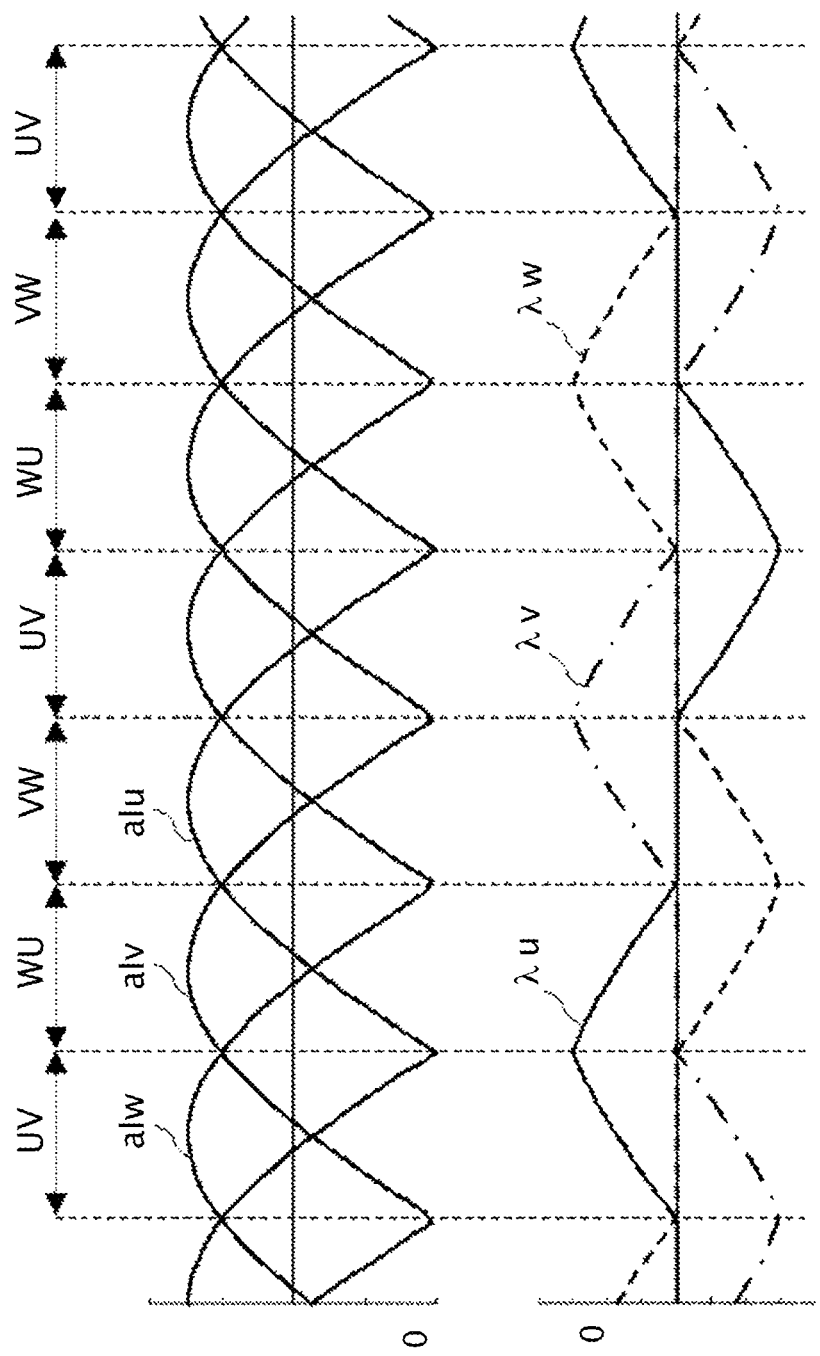
FIG. 7A is a timing diagram showing absolute value signals of output current.
FIG. 7B is a timing diagram showing modulation signals.

FIGS. 7A and 7B show an example of the relation between output current absolute values and modulation signals in this case. For example, in the interval indicated as interval UV in FIG. 7A, the absolute value aIw of the output current Iw is largest. Hence the phase voltage instruction Viw for the W phase is set to 0 V. As a result, the phase voltage instruction Viu for the U phase becomes Viu=−Viwu, and the phase voltage instruction Viv for the V phase becomes Viv=Viuv. Next, by performing similar computations for the intervals WU, VW, . . . , the phase voltage instructions Viu, Viv, Viw for each phase shown in FIG. 7B can be obtained. And from the phase voltage instructions Viu, Viv, Viw for each phase, the modulation signals λu, λv, λw for each phase can be obtained.

Thereafter, operation of the control circuit $6c$ is the same as the case in which the above-described inverter circuit 3 is operated as an ordinary three-phase inverter.

As a result, control signals for the semiconductor switching elements Qu to Qw and Qx to Qz and for the switch elements Su to Sw and Sx to Sz can be obtained.

The semiconductor switching elements Qu to Qw and Qx to Qz and switch elements Su to Sw and Sx to Sz of the inverter circuit 3 perform on/off operation according to the above-described control signals generated by the control circuit $6c$. At this time, the semiconductor switching elements of the phase with the larges output current absolute value are in the off state. Further, the bidirectional switch connected to this phase is in the on state. On the other hand, the semiconductor switching elements of the remaining two phases perform switching operation. As a result, the inverter circuit 3 operates as a V-connected inverter.

Further, when the inverter circuit 3 operates as a V-connected inverter, phases performing switching operation are switched in sequence according to the magnitude relation between the absolute values of the output currents. As a result, losses of the semiconductor switching elements are rendered uniform.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2010-281950, filed on Dec. 17, 2010. The disclosure of the priority application, in its entirety, including the drawings, claims, and the specification thereof, is incorporated herein by reference.

What is claimed is:

1. A three-phase inverter device, comprising:
   a DC voltage source series circuit, formed by series connection of a first DC voltage source and a second DC voltage source;
   a first terminal connected to a positive-side terminal of the DC voltage source series circuit, a second terminal connected to a negative-side terminal of the DC voltage source series circuit, and a third terminal connected to a connection point of the first DC voltage source and the second DC voltage source; and
   three switching element series circuits groups, each formed by series connection of positive-side and negative-side semiconductor switching elements, to each of which a diode is antiparallel-connected, one end of each of the switching element series circuits is connected to the first terminal and another end being connected to the second terminal, and each connection point of the positive-side semiconductor switching element and the negative-side semiconductor switching element being a three-phase AC output terminal;

wherein the AC output terminal for each phase of the three-phase inverter device is connected via a bidirectional switch to the third terminal;

wherein, when the voltage across the first and second terminals of the DC voltage source series circuit is higher than a first prescribed value, the positive-side and negative-side semiconductor switching elements of one of the phases are made non-conducting, the bidirectional switch connecting the AC output terminal for the one phase and the third terminal is made conducting, and the positive-side and negative-side semiconductor switching elements of the other two phases and the bidirectional switches connected to the other two phases are caused to perform switching operation;

wherein, when the voltage across the first and second terminals of the DC voltage source series circuit is lower than a second prescribed value, the positive-side and negative-side semiconductor switching elements and bidirectional switches of all phases of the three-phase inverter device are caused to perform a switching operation; and wherein, when the voltage across the first and second terminals of the DC voltage source series circuit is higher than a third prescribed value, the positive-side and negative-side semiconductor switching elements of two phases for which an absolute value of the voltage across the AC output terminals is highest and the bidirectional switches connected to the two phases are caused to perform a switching operation, the positive-side and negative-side semiconductor switching elements of the remaining one phase are made non-conducting, and the bidirectional switch connected to the remaining phase are made conducting.

2. The three-phase inverter device according to claim 1, wherein, when the voltage across the first and second terminals of the DC voltage source series circuit is higher than a fourth prescribed value, the positive-side and negative-side semiconductor switching elements of the phase, for which an absolute value of the current output from the AC output terminals is largest, are made non-conducting, the bidirectional switch connected to this phase is made conducting, and the positive-side and negative-side semiconductor switching elements and the bidirectional switches connected to the other two phases are caused to perform a switching operation.

* * * * *